ical State Patent Office 3,728,283
Patented Apr. 17, 1973

3,728,283
MODIFIED Al-Nn CATALYST FOR DIMERIZING OLEFINS
Yves Chauvin, Saint Germain en Laye, and Jean Gaillard, Carrieres-sur-Seine, France, assignors to Institut Francais du Petrole, Rueil Malmaison, France
No Drawing. Filed May 15, 1970, Ser. No. 37,878
Claims priority, application France, May 20, 1969, 6916444
Int. Cl. C07c 3/10
U.S. Cl. 252—429 B    16 Claims

ABSTRACT OF THE DISCLOSURE

This invention relates to the manufacture of a dimerization catalyst, to the catalyst thus obtained and to a process for dimerizing olefins with the said catalyst.

The catalyst is manufacture by reacting a dihydrocarbyl aluminum monohalide with a controlled amount of water at a temperature less than 20° C., then separating the insoluble fraction and thereafter contacting the soluble fraction with nickel or a nickel compound.

The catalyst is preferably used at temperatures higher than 25° C.

---

This invention relates to the manufacture of a catalyst which may be used, for example, for dimerizing and co-dimerizing olefins.

Known catalysts, which may be used in this type of reaction have been obtained by contacting nickel or a nickel compound with at least one di-hydrocarbyl-aluminum mono-halide and water in a solvent.

The nickel compound or nickel itself was introduced in the reaction mixture in such amounts, for example, that the atomic ratio Al/Ni be 0·02 to 500.

Water was used in an amount of less than 2 moles per mole of di-hydrocarbyl-aluminum mono-halide. The admixture of nickel or the nickel compound with the di-hydrocarbyl-aluminum mono-halide and water was usually carried out in the presence of the olefins which had to be dimerized or co-dimerized.

Although this manufacture seems to be simple, its use on the industrial scale results in some difficulties and inconveniences which are avoided by this invention:

(a) When the catalyst components are brought into contact, there is produced a heterogeneous mixture and a gas release which are detrimental to the dimerization or co-dimerization reaction when carried out continuously, since they result, for example, in stoppings or sedimentations, (b) The temperatures which must be used for obtaining a high activity of the catalyst being lower than room temperature, are usually unsuitable for carrying out the dimerization or co-dimerization reaction, particularly in view of the resulting low reaction velocities and the high operational cost due to the use of refrigerating devices over long periods.

(c) Water dissolves quite slowly in hydrocarbons and it is difficult to know with a sufficient precision the amounts of water thus introduced. This relative incertitude is the greater when the amount of water to be dissolved in the smaller.

It is an object of the present invention to avoid these inconveniences by providing an improved process for manufacturing these catalysts.

According to this invention, a di-hydrocarbyl-aluminum mono-halide, such as hereafter defined, is contacted with water, in a solvent, in the absence of nickel compound in a first step of the reaction. This results in a mixture of an insoluble solid fraction and a liquid fraction.

These two fractions are separated in a second step, and, in a third step, the separated liquid fraction is admixed with nickel or a nickel compound preferably one soluble in the used solvent. The obtained liquid phase constitutes the catalyst.

This process obviates the inconveniences of the prior known process: this catalyst manufacture in two steps with the intermediate separation of the formed insoluble compounds and the absence of olefin to be dimerized or co-dimerized avoid the settlement of insoluble products in the apparatus used for the dimerization or co-dimerization reaction.

Moreover, it is now possible to carry out the dimerization or co-dimerization reaction at a temperature higher than the temperature used during the manufacture of the catalyst.

Finally, the amount of water may be determined with accuracy since water is added to a solvent amount which is usually smaller than the amount of the reaction mixture in the already known process.

Thus the first step of this process consists essentially of contacting a di-hydrocarbyl-aluminum mono-halide with water in a solvent at a temperature lower than 20° C.

The di-hydrocarbyl-aluminum mono-halide has the formula $(R_1R_2)Al-X$ in which X is a halogen and $R_1$ and $R_2$ are hydrocarbon monovalent radicals, for example alkyl, alkenyl, cycloalkyl, cycloalkenyl, aryl, arylalkyl, arylalkenyl, alkaryl, alkenylaryl, or a corresponding radical in which aryl is substituted with a monovalent heterocycle radical. By way of preference, the alkyl and alkenyl radicals may have 1–20 carbon atoms, the cycloalkyl and cycloalkenyl radicals 5–20 carbon atoms, the aryl radicals 6–20 carbon atoms, the arylalkyl, arylalkenyl, alkaryl and alkenylaryl radicals 7–20 carbon atoms, and the heterocycle radicals of aromatic nature 2 to 12 carbon atoms with 1 to 3 heteroatoms selected from the group consisting of =N—, —S— and —O—.

By way of non-limitative examples, the following radicals may be mentioned: methyl, ethyl, n-propyl, iso-butyl, n-pentyl, n-dodecyl, eicosyl, phenyl, naphthyl, tolyl (ortho, meta or para) xylyl, cyclopentyl, cyclohexyl, cyclodecyl, allyl, cyclohexenyl, and cinnamyl.

The di-hydrocarbyl-aluminum chlorides and bromides are preferred to the other halides.

The molar ratio $H_2O/AlR_1R_2X$ between the reactants may be 0.01 to 2, preferably 0.2 to 1. The concentration by weight of each of these reactants will be preferably lower than 30%, advantageously between 1 and 20%.

A liquid hydrocarbon or a liquid hydrocarbyl halide may be used as solvent, for example hexane, heptane, cyclohexane, benzene, chlorobenzene or a chloronaphthalene.

However a preferred solvent is an olefin having 3 to 20 carbon atoms, particularly an olefin which is a reactant or a reaction product in the dimerization or co-dimerization process to be catalysed.

As a rule the solvent will have 3–20 carbon atoms and 0.3 halogen atoms per molecule.

Either water will be introduced slowly in the di-hydrocarbyl-aluminum halide solution, or the aluminum compound or a solution thereof will be introduced in the solvent containing a convenient amount of water.

The temperature, which is lower than 20° C., may be selected as low as permitted by the reactivity of the two starting compounds. For convenience reasons, it will not be usually lower than −20° C., a preferred range being −5 to +15° C.

According to this invention, during the third step, nickel or a nickel compound, preferably one which is soluble in the used solvent, is added to the liquid fraction separated during the second, intermediate step. The thus introduced amount will correspond, for example, to 0.002–50 gram-atoms of nickel per gram-atom of aluminum introduced during the first step, the preferred range being 0.02 to 50.

Nickel may be used as metal or as a compound, preferably one soluble in the selected inert solvent. The reaction velocity is usually somewhat higher with the soluble compounds than with nickel itself. By way of examples of nickel compounds, the following may be mentioned: the salts of nickel with organic or inorganic acids, for example, nickel dichloride, nickel diiodide, nickel sulfate, nickel diacetate, nickel divalerate, nickel naphthenates, nickel sulfonates, nickel dibutyldithiocarbamate. Organic complexes may be used, for example nickel acetylacetonate, nickel carbonyl, bis-cyclopentadienyl nickel, allyl-nickel chloride.

The preferred complexes are those obtained from inorganic salts of nickel with trivalent organic compounds of phosphorus, arsenic and antimony. Among the inorganic salts of nickel, the halides, i.e. fluorides, chlorides, bromides and iodides, the nitrate, the cyanide and the sulfocyanide are preferred. The organic compounds forming complexes with the nickel salts to be used as dimerization and co-dimerization catalysts are those of general formula: $Y(R_1R_2R_3)$ wherein Y is phosphorus, arsenic or antimony, $R_1$, $R_2$ and $R_3$, either identical or different are monovalent hydrocarbon radicals each of them containing 1–20 carbon atoms, for example alkyl (primary, secondary or tertiary) alkenyl, cycloalkyl, cycloalkenyl, aryl, aralkyl, halogen atoms or hydrogen atoms. At least one of $R_1$, $R_2$ and $R_3$ is a hydrocarbon radical such as defined hereinbefore. Two or three valences of Y may be linked to the same hydrocarbon radical, as for example in phospholes, phospholines or phosphorinanes. The following compounds are examples of compounds of the $Y(R_1R_2R_3)$ type: phenyldicyclopentyl phosphine, tricyclohexylphosphine, dichlorophenylphosphine, triisopropylphosphine, tricyclopentylphosphine, di-tert-butylphosphine.

Nickel may also be used; it may be obtained either by at least partial attack of alloys of nickel with other metals (for example Ni-Al, Ni-Si or Ni-Zn which may be attacked by alkali metal hydroxides with dissolution of the second metal) or by reduction of nickel oxide or any other reducible nickel compound either as such or admixed with a solid carrier, for example kieselguhr, alumina, silica, sepiolite, pumice, carbon and the like.

The invention also relates to the catalyst obtained by the above process. It finally relates to a process for dimerizing or co-dimerizing olefins, said process consisting of contacting at least one olefin with a catalyst such as hereinbefore defined, in liquid phase, at a temperature of 25 to 100° C., and preferably 35 to 60° C. This process may be applied to the dimerization or the co-dimerization of mono-olefins having 2–12 carbon atoms per molecule, for example ethylene, propylene, 1-butene, 2-butene and the corresponding di-olefins. It relates particularly to monoolefins having 3–5 carbon atoms.

The following examples are given by way of illustration and not of limitation:

EXAMPLE 1

50 ml. of a mixture of 1-butene and 2-butene, 200 microliters of water and, dropwise, 4.5 ml. of diethylaluminum chloride are introduced into an ice-cooled vessel. The temperature is 4° C. 180 ml. of gas are evolved and a white precipitate is formed. This precipitate is filtered and the liquid phase is recovered.

25 mg. of nickel dichloride, 2-triphenylphosphine, 105 g. of a mixture of 1-butene and 2-butene and 5 ml. of the previously obtained liquid phase are introduced into a 500 ml. reaction vessel of the Grignard type. The temperature is maintained at 40° C. for 3 hours under stirring. There are obtained 96.6 grams of a liquid phase consisting of isomers of octene distilling between 121 and 127° C.

EXAMPLE 2

30 ml. of a mixture of $C_6$, $C_7$ and $C_8$ olefins obtained from a preceding operation of codimerization of propylene with 2-butene, 300 microliters of water and, dropwise, 4.05 ml. of diethylaluminum chloride are introduced into an ice-cooled vessel. The temperature is maintained at +4° C. 228 ml. of gas are evolved and a precipitate is formed. Finally this precipitate is separated by filtration.

16 mg. of the $NiCl_2$, 2-tributylphosphine complex, 91 grams of 2-butene and 5 ml. of the aluminum compound solution obtained hereabove, are introduced into a reaction vessel of the Grignard type. The temperature is raised to 42° C. and propylene is introduced therein. The pressure is so controlled as to maintain a molar concentration of propylene in the liquid phase amounting to about 5% of the butene concentration.

After 185 minutes, the reaction is interrupted by air injection. The excess of butene is distilled off and there is recovered 64 grams of a mixture of olefins distilling between 50 and 120° C., the composition by weight of which is:

|   | Percent |
|---|---|
| Iso-hexenes | 37 |
| Iso-heptenes | 58 |
| Iso-octenes | 5 |

There remains 6 grams of undistillable products.

EXAMPLE 3

Propylene and butene have been subjected to co-dimerization using the same solution as described in Example 2, except that it had been manufactured 6 days before. Under equivalent conditions, there were obtained 75 grams of olefins boiling between 50 and 120° C. with the following composition by weight:

|   | Percent |
|---|---|
| Iso-hexenes | 44 |
| Iso-heptenes | 47 |
| Iso-octenes | 9 |

The undistillable residue amounted to 6 grams.

EXAMPLE 4

A solution of an active aluminum compound is manufactured as described in Example 2, starting from 33 millimoles of diethyl aluminum chloride and 8.25 millimoles of water.

The co-dimerization of propylene and butene has been carried out as described in Example 2, using 16 mg. of nickel dichloride, 2-tri-butyl phosphine, 83 g. of 2-butene and 5 ml. of the solution of the aluminum compound, the reaction temperature being 42° C.

This resulted, after 195 minutes, in the production of 57.5 g. of a mixture of olefins distilling between 50 and 120° C., the composition by weight of which was as follows:

|   | Percent |
|---|---|
| Iso-hexenes | 41 |
| Iso-heptenes | 50 |
| Iso-octenes | 9 |

We claim as our invention:

1. A process for manufacturing a catalyst suitable for dimerizing and co-dimerizing olefins, said process comprising a first step of reacting a dihydrocarbyl aluminum monohalide with water in an inert solvent, at a temperature lower than 20° C. the molar ratio of the water to the dihydrocarbyl aluminum monohalide being 0.01:1 to 2:1, a second step of separating the insoluble solid fraction from the liquid fraction resulting from the first step reaction, and a third step of admixing the said liquid fraction with nickel, or a nickel compound selected from the group consisting of an inorganic salt of nickel, a nickel salt of a hydrocarbyl carboxylic acid, nickel sulfonate, nickel dibutyldithiocarbamate, nickel acetylacetonate, nickel carbonyl, bis-cyclopentadienyl nickel, allyl-nickel chloride, and a complex of an inorganic salt of nickel with a compound of the formula $Y(R_1R_2R_3)$ wherein Y is phosphorus, arsenic or antimony, $R_1$, $R_2$ and $R_3$ each is a monovalent hydrocarbyl of 1–20 carbon atoms, hydrogen or halogen with the provision that at least one of $R_1$, $R_2$ and $R_3$ is said hydrocarbyl, wherein the amount of nickel in the third step is 0.002 to 50 gram-atoms per gram-atoms of aluminum used in the first step.

2. A process according to claim 1, wherein the solvent is a hydrocarbon solvent.

3. A process according to claim 1, wherein the solvent is a hydrocarbon halide.

4. A process according to claim 2, wherein the solvent consists of at least one mono-olefin having 3–20 carbon atoms per molecule.

5. A process according to claim 1, wherein the first step reaction temperature is between $-20$ and $+20°$ C.

6. A process according to claim 1, wherein water and the dihydrocarbyl aluminum monohalide are used in a molar ratio of 0.2/1 to 1/1 in the first reaction step.

7. A process according to claim 1, wherein each of water and the dihydrocarbyl aluminum monohalide are used in an amount less than 30% by weight with respect to the first step reaction mixture.

8. A process according to claim 1, wherein each of water and the dihydrocarbyl aluminum monohalide are used in an amount between 1 and 20% by weight with respect to the first step reaction mixture.

9. A process according to claim 1, wherein the amount of nickel in the third step is 0.02 to 50 gram-atoms per gram-atom of aluminum used in the first step.

10. A catalyst as obtained by the process of claim 1.

11. A process as defined by claim 1 wherein said member admixed in said third step is a nickel compound soluble in said inert solvent.

12. A process as defined by claim 1 wherein said member is a nickel organic complex obtained from an inorganic salt of nickel and a compound of the formula $Y(R_1R_2R_3)$ wherein Y is phosphorous, arsenic or antimony, $R_1$, $R_2$ and $R_3$ each is monovalent hydrocarbyl of 1–20 carbon atoms, hydrogen or halogen with the provision that at least one of $R_1$, $R_2$ and $R_3$ is said hydrocarbyl.

13. A process as defined by claim 12 wherein said inorganic salt is a salt of nickel selected from the group consisting of nickel halide, nickel nitrate, nickel cyanide and nickel sulfocyanide.

14. A catalyst as obtained by the process of claim 11.

15. A catalyst as obtained by the process of claim 12.

16. A catalyst as obtained by the process of claim 13.

References Cited

UNITED STATES PATENTS

| | | | |
|---|---|---|---|
| 3,152,105 | 10/1964 | Long | 252—429 BX |
| 3,462,406 | 8/1969 | Natta et al. | 252—429 BX |
| 3,492,245 | 1/1970 | Calderon et al. | 252—429 B |
| 3,546,134 | 12/1970 | Wofford et al. | 252—431 R |

PATRICK P. GARVIN, Primary Examiner

U.S. Cl. X.R.

252—428, 430, 431 R, 431 C, 431 N, 431 P; 260—683.15 D